United States Patent [19]
Carney

[11] Patent Number: 5,838,732
[45] Date of Patent: *Nov. 17, 1998

[54] REDUCING PEAK-TO-AVERAGE VARIANCE OF A COMPOSITE TRANSMITTED SIGNAL GENERATED BY A DIGITAL COMBINER VIA CARRIER PHASE OFFSET

[75] Inventor: Ronald R. Carney, Palm Bay, Fla.

[73] Assignee: AirNet Communications Corp., Melbourne, Fla.

[*] Notice: The terminal 4 months of this patent has been disclaimed.

[21] Appl. No.: 331,778

[22] Filed: Oct. 31, 1994

[51] Int. Cl.⁶ .......................... H04L 25/03; H04L 27/36; H04J 9/00; H03C 3/02
[52] U.S. Cl. .......................... 375/297; 375/298; 375/302; 370/343
[58] Field of Search .................................. 455/33.1, 33.3, 455/34.1, 34.2, 33.2, 63, 52.1, 422, 426; 320/70, 58, 69.1, 120, 122, 339, 342, 343, 345, 478, 480, 481, 487, 307; 375/295, 296, 298, 302, 303, 306, 307, 308, 309, 260, 261, 269, 271, 278, 281, 284, 285; 332/119, 120, 123, 124, 125, 126

[56] References Cited

U.S. PATENT DOCUMENTS

| 4,316,282 | 2/1982 | Macina . |
|---|---|---|
| 4,785,447 | 11/1988 | Ichiyoshi . |
| 4,881,191 | 11/1989 | Morton . |
| 5,201,071 | 4/1993 | Webb ........................................ 455/101 |
| 5,289,464 | 2/1994 | Wang . |
| 5,323,391 | 6/1994 | Harrison . |

FOREIGN PATENT DOCUMENTS

| A2/270819 | 3/1994 | United Kingdom . |
|---|---|---|
| 9410772 | 5/1994 | WIPO . |

OTHER PUBLICATIONS

Bonnerot, et al., "Digital Processing Techniques in the 60 Channel Transmultiplexer", IEEE Transactions on Communications vol. COM–26, May 1978, pp. 698–706.

Bellanger, et al., "TDM–FDM Transmultiplexer: Digital Polyphase and FFT", IEEE Transactions on Communications, vol. COM–22, Sep. 1974, pp. 1199–1205.

Bakhru, "Multi–Channel Digital Sonobouy Receiver", in MILCOM 90: IEEE Military Communications Conference Record, (New York: Institute of Electrical and Electronic Engineers, 1990), vol. 3, pp. 1250–1255.

Chester, et al., "Implementation of a Wide Band, High Dynamic Range Digital Drop Receiver", IEEE Proceedings of ICASSP 91, May 14–17, 1991.

Olmstead et al., "A Digital Tuner for Wideband Receivers", DSP Applications Magazine, Sep., 1992.

Gimlin, D.R. and Patisaul, C.R., "On Minimizing the Peak-to-Average Power Ratio for the Sum of N Sinusoids", IEEE Transactions on Communications, vol. 41, No. 4, pp. 631–635, Apr. 1993.

Primary Examiner—Wellington Chin
Assistant Examiner—William Luther
Attorney, Agent, or Firm—Farkas & Manelli PLLC

[57] ABSTRACT

A technique which enables the use of a low cost linear power amplifier to generate a wideband composite signal, such as in cellular mobile telephone (CMT), personal communication system (PCS), or other multi-channel wireless systems. A composite signal is generated by a wideband digital combiner as a frequency multiplexed combination of many narrowband modulated digital carrier signals. The technique involves introducing predetermined phase shifts into each of the digital channel signals after a baseband modulation step. The wideband composite signal thus exhibits a reduced peak-to-average signal power, despite the fact that the phases of the digital carrier signals cannot be directly controlled. This permits the use of a power amplifier, which may have a much smaller peak-to-average rating.

18 Claims, 2 Drawing Sheets

REDUCING PEAK-TO-AVERAGE VARIANCE OF A COMPOSITE TRANSMITTED SIGNAL GENERATED BY A DIGITAL COMBINER VIA CARRIER PHASE OFFSET

FIELD OF THE INVENTION

This invention relates generally to multichannel wireless communication systems, and in particular to a multichannel transmitter which offsets variations in the envelope of a transmitted signal by effectively adjusting the phase of the resulting carrier signals.

BACKGROUND

The providers of certain multiple-access communications systems, such as wireless cellular mobile telephone (CMT) and personal communication services (PCS), prefer to employ basestation transmitter and receiver equipment that is as flexible as possible in terms of the channel coverage provided by a particular transceiver site. This is true for wireless systems deployed in rural areas, where signal traffic may be concentrated along a roadway, as well as for systems deployed in densely populated areas, where a fixed-in-advanced channel capacity may be inadequate. Such characteristics are also desirable whenever relatively large, secure, and protective structures are not necessarily available or cost effective. For example, in certain PCS systems as now being proposed, a large number of small coverage areas, or cells, will be necessary. In these PCS systems, wireless basestation equipment may be deployed in cells as small as 500 feet in diameter.

One way to resolve these difficulties is to implement a basestation transceiver using high speed analog-to-digital (A/D) and digital-to-analog (D/A) converters, together with efficient digital filtering algorithms such as the Fast Fourier Transform (FFT). In the receiver section, a forward FFT-based filter bank analyzer, or so-called channelizer, separates the incoming signal energy into multiple ones of the desired channels. On the transmit side, an inverse FFT-based filter bank synthesizer, or so-called combiner, outputs a composite frequency-modulated signal representative of the contents of the combined channel signals. In this manner, relatively compact, lightweight, inexpensive, and reliable digital integrated circuits may be used to cover the entire channel capacity offered by the communication service provider.

For a more detailed description of such a system, please refer to our co-pending United States patent application of Carney, R., and Williams, T., entitled "Transceiver Apparatus Employing Wideband FFT Channelizer with Output Sample Timing Adjustment and Inverse FFT Combiner for a Multichannel Communication Network" filed Apr. 8, 1994 and given Ser. No. 08/224,754.

Unlike prior art basestations, such a wideband digital basestation is capable of receiving or transmitting on any number of channels at any instant in time. While this provides maximum channel assignment flexibility and a certain number of other advantages, it also poses a number of unique problems.

In particular, consider that the individual signals may use modulation schemes that do not exhibit a constant amplitude envelope, such as amplitude modulation (AM), or quadrature amplitude modulation (QAM). Even when constant envelope modulation schemes, such as frequency modulation (FM), frequency shift keying (FSK), or phase shift keying (PSK), or minimum shift keying (MSK) are used for the individual channel signals, the composite waveform generated by the combiner cannot be guaranteed to exhibit a constant envelope.

This is because the composite signal is a sum of digital channel signals having non-deterministic phases, and because the channels may be activated independently of each other. Thus, even when the modulation used for each channel has a constant amplitude envelope over time, the composite signal will not exhibit a constant envelope. Rather, the composite signal can be predicted to have a uniformly random phase distribution and a Rayleigh probability density amplitude envelope.

The resulting Rayleigh-distributed envelope has undesirably high peak-to-average power requirements that place demanding linearity and dynamic range requirements on the transmit signal path. These requirements are especially acute for a high-power amplifier component which must be placed between the output of the combiner and the antenna. Because of this phenomenon, for example, a 50 Watt transmit amplifier may actually be required to handle 250 Watt signals for short periods of time. That is, the instantaneous peak power output must typically be about five (5) times the average power output, and the power amplifier design must achieve this with minimal distortion to the individual channel signals and without creation of in-band or out-of-band spurious tones.

While it is possible to design a power amplifier which has sufficient linearity to achieve this result, such an amplifier is decidedly more complex in design, less efficient, and more expensive than would otherwise be required.

Others have recognized certain related problems in minimizing the peak-to-average power envelope of a composite signal. For example, the article by Gimlin, D. R. and Patisaul, C. R., entitled "On Minimizing the Peak-to-Average Power Ratio for the Sum of N Sinusoids," published in *IEEE Transactions on Communications*, Vol. 41, No. 4, April 1993, pp. 631–635, discusses the problem of generating a sum of a integer number, N, of equally spaced, unmodulated or identically modulated carrier signals. That article recognizes that a worst case situation occurs, in terms of peak-to-average transmitter power ratio, when the carrier signals happen to have zero phase at the same instant in time. The net effect of this sum of N in-phase sinusoids is to induce a ripple in the transmitter output. This ripple effect is not unlike the so-called Gibbs phenomenon which occurs in the output of a low pass Finite Impulse Response (FIR) filter due to the discrete truncation of a Fourier series approximation to the ideal filter.

One approach to minimizing the peak-to-average power ratio, as explained in the Gimlin article, is to impart a so-called Newman relationship between the phases of the individual carrier signals. While this Newman phase offset scheme might appear to be a solution to the problem of minimizing the peak-to-average power ratio in a system which generates a wideband composite signal using an inverse FFT-based filter bank synthesizer, there are several practical considerations which are problematic.

First, the Newman phase offset scheme assumes that each of the N signals are of an equal amplitude, and that each of the N signals are an identically modulated sinusoid. In any practical system, neither of these restraints is ever true. Each channel will typically contain a different baseband voice and/or data signal which has a unique amplitude and/or modulation that depends upon the instantaneous values of the voice and/or data signals that are to be transmitted.

Secondly, there is no way to directly control the phases of the carrier signals generated by a wideband, inverse FFT-based synthesizer. In particular, the only inputs to the inverse FFT are the individual signals for each channel. The digital carrier signals are completely synthesized by the inverse FFT, in strict accordance with the inverse FFT algorithm. Unfortunately, the inverse FFT algorithm cannot be directly altered to generate carrier signals having a prescribed phase relationship, since an improper Fourier transform would then result. As such, the above-mentioned Gibbs-like distortion phenomenon will thus occur in the output of the inverse-FFT.

It would thus appear that if one intends to use an inverse FFT-based synthesizer to generate the composite signal in a multichannel communications system, one must accept the risk of introducing distortion in the output. It would also appear that one must select an output power amplifier having linearity and peak power requirements in excess of what would otherwise be expected.

What is needed is a way to adjust the phases of the individual carrier signals in a composite signal generated by an inverse FFT-based synthesizer, so that the peak-to-average output power can be minimized.

DISCLOSURE OF THE INVENTION

OBJECTS OF THE INVENTION

Accordingly, the present invention aims to provide a digital signal synthesizer for use in a multichannel communications system which makes use of an inverse FFT or other digital filter bank process, to generate a composite signal consisting of multiple channel signals modulated onto a like number of evenly spaced apart carrier signals, and wherein the resulting carrier signals have a prescribed phase relationship.

A further object of the invention is to provide an improved digital synthesizer, which produces a composite signal having a minimum peak-to-average power.

Another object of the invention is to provide a digital synthesizer wherein distortion of a composite signal is minimized.

Yet another object of the invention is to reduce the linearity and dynamic range requirements of a power amplifier used in conjunction with a wideband digital synthesizer.

SUMMARY OF THE INVENTION

Briefly, the invention is a technique to control the phases of the carriers of a multichannel composite signal generated by a digital synthesizer. The carrier phases are adjusted by imparting a predetermined phase offset to each channel signal as part of a baseband modulation process, prior to feeding the channel signals to the digital synthesizer.

The predetermined phase offsets depend upon the bandwidth of the digital synthesizer and the frequency spacing between channels, and a different phase offset is typically determined for each channel. In a preferred embodiment, the phase offsets, Pi, are calculated according to the relationship:

$$\phi_i = e^{-j\frac{\omega^2}{4\alpha}}$$

where e is the complex exponential, ω is the total bandwidth in radians per second of the wideband composite signal c(t) {e.g., the number of input channels, n, times the bandwidth of each channel}, and α is given by:

$$\alpha = \frac{i\pi}{T}$$

where 1/T is the channel spacing, also in radians per second.

The invention has several advantages. The signal output by the digital synthesizer has an envelope characteristic which has far smaller peaks variations than would otherwise occur. As a result, the output power amplifier no longer needs to exhibit extreme linearity or excessive power characteristics.

Furthermore, the prescribed phase relationship is maintained between the digitally synthesized carrier signals without altering the steps of the digital synthesizing process. This permits the use of standard, well-known processing algorithms and components such as an inverse Fast Fourier Transform (FFT) to implement the digital synthesizer.

BRIEF DESCRIPTION OF THE DRAWINGS

For a more complete understanding of the advantages provided by the invention, reference should be had to the following detailed description together with the accompanying drawings, in which.

DETAILED DESCRIPTION OF A PREFERRED EMBODIMENT

A. Introduction

Figure 1:
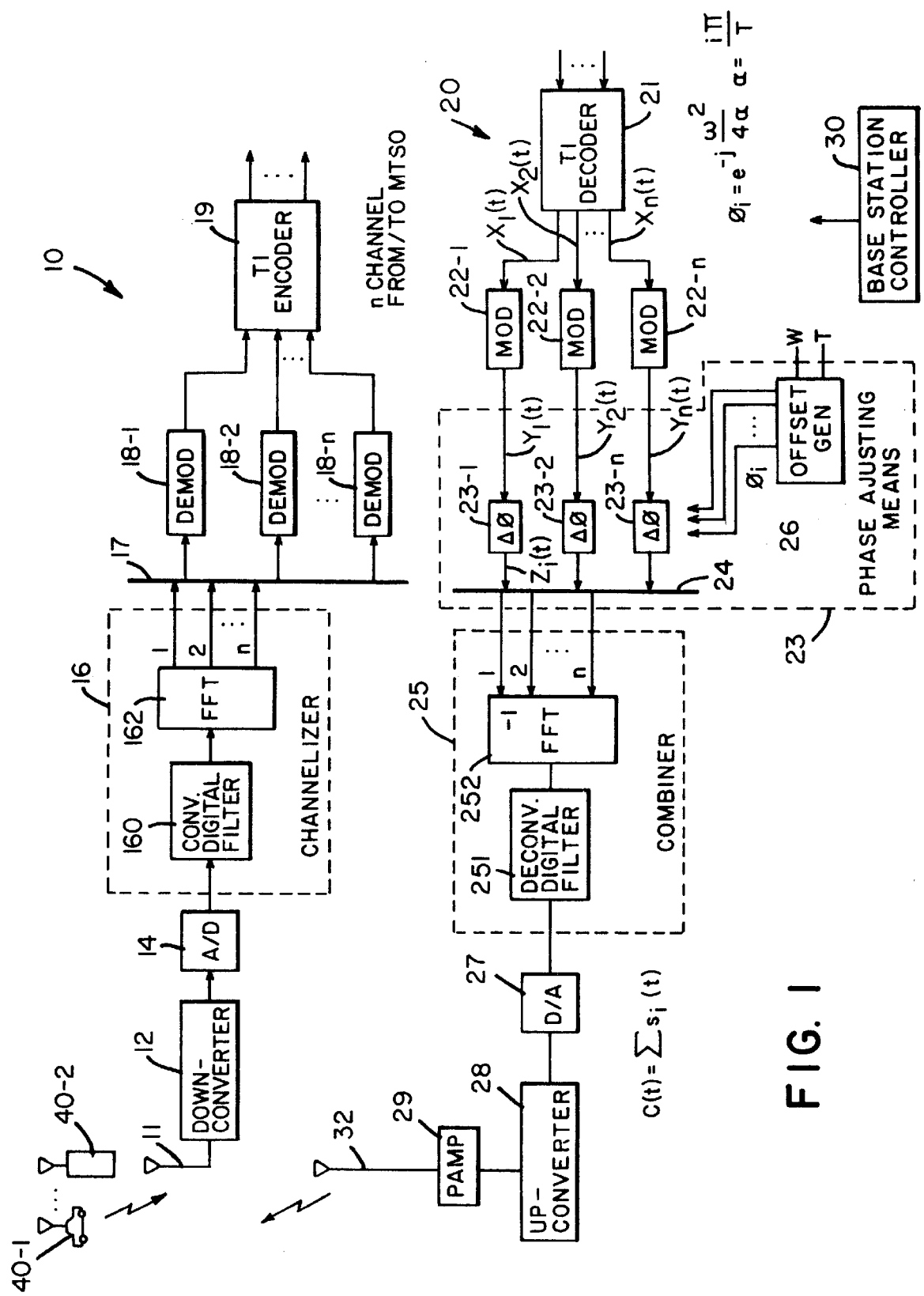
FIG. 1 is a block diagram of wideband digital transceiver that makes use of a digital filter bank synthesizer, phase-modulators, and phase offset generator according to the invention.

FIG. 1 is a block diagram of a multichannel wireless digital basestation according to the invention. The basestation consists of a receiver section 10, a transmitter section 20, and a basestation control processor (controller) 30.

The receiver section 10 consists of a receive antenna 11, a frequency down-converter 12, an analog-to-digital (A/D) converter 14, a digital filter bank analyzer or so-called channelizer 16, a first time division multiplex (TDM) bus 17, an integer number, m, of digital demodulators 18-1, 18-2, . . . ,18-m (collectively, the demodulators 18), and a transport signal encoder 19.

The transmitter section 20 includes a transport signal decoder 21, a plurality of digital modulators 22-1, 22-2, . . . ,22-m (collectively, the modulators 22), a like plurality of digital phase shifters 23-1, 23-2, . . . ,23-m, a second TDMA bus 24, a digital filter bank synthesizer, or so-called combiner 25, a digital phase offset generator 26, a digital-to-analog (D/A) converter 27, a frequency up-converter 28, a power amplifier 29, and a transmit antenna 32.

In operation, the basestation exchanges radio frequency (RF) signals with a number of mobile 40-1 or portable 40-2 subscriber terminals (collectively, mobiles 40). These RF signals typically include voice and/or data channel signals which are frequency multiplexed by modulating them onto one or more carrier signals. The basestation serves to couple these channel signals to the public switched telephone network (PSTN), such as via a Mobile Telephone Switching Office (MTSO).

The particular RF modulation used to communicate with the mobiles 40 may be in accordance with any one of a number of different air interface standards, including frequency modulation (FM) as specified by the well known Advanced Mobile Phone Service (AMPS) standard, time division multiple access (TDMA) such as in the IS-54B standard, code division multiple access (CMDA) as in the IS-95 standard, or other modulations, such as those specified by the European Global System Mobile (GSM) standard, personal communication services (PCS) standards, or the like.

The present invention is concerned with a technique for minimizing the peak-to-average variance in the envelope of a composite signal generated by the transmitter power amplifier 29, through the use of the digital phase shifters 23 and digital phase offset generator 26. However, a brief description of the wideband receiver 10 first will assist in understanding the invention.

B. The Wideband Receiver 10

In operation, the frequency multiplexed RF signals from the mobiles 40 are received at the receive antenna 11 and then forwarded to the wideband downconverter 12. The downconverter 12 translates the center frequency of the RF signals received at the antenna 11 to an intermediate frequency (IF) within the bandwidth of the A/D converter 14. The downconverter 12 may actually use several stages of mixers, amplifiers, and bandpass filters, as is well known in the art.

The downconverter 12 is wideband in the sense that it covers a substantial portion of the bandwidth available to the wireless service provider who is operating the basestation. For example, if the air interface implemented by the basestation is IS-54B, the downconverter 12 may process as much as a 12.5 MegaHertz (MHz) bandwidth in the 800–900 MHz range. This bandwidth contains a composite signal that may include as many as 416 active channel signals, each having an approximately 30 kiloHertz (kHz) bandwidth. Usually, one-half of the channels are reserved for transmitting signals and one-half for receiving. Thus, in the IS-54B example being described, there are typically two-hundred-eight (208) channels processed by the receiver 10 and 208 channels processed by the transmitter 20.

The digital signal output by the A/D converter 14 is then forwarded to the digital channelizer 16. The digital channelizer 16 is essentially a bank of digital filters, which separate the down converted composite signal to a plurality, n, of individual digital channel signals. In the case of the IS-54B example, the digital channelizer 16 can thus be considered to be a bank of 208 digital filters, with each filter having a 30 kHz bandwidth.

The channelizer 16 may implement the digital filter bank using any of several different filtering techniques, such as described in Crochiere, R. E., and Rabiner, L. R., *Multirate Digital Signal Processing* (Englewood Cliffs, N.J.: Prentice-Hall, 1983), Chapter 7, pp. 289–400. The channelizer 16 may, for example, use a convolutional digital filter 160 followed by a Fast Fourier Transform (FFT) 161. The convolutional filter may make use of so-called overlap-and-add or polyphase digital filtering techniques. A co-pending United States patent application entitled "Transceiver Apparatus Employing Wideband FFT Channelizer with Output Sample Timing Adjustment and Inverse FFT Combiner for a Multichannel Communication Network" filed on Apr. 8, 1994 and given Ser. No. 08/224,754 describes several particular embodiments of the digital channelizer 16 in greater detail.

Regardless of the details of the implementation of the channelizer 16 however, it provides a number, n, of individual digital channel signals, wherein each of these n outputs represents the signal in one of the channels received from one of the mobiles 41.

The digital channel signals at the output of the channelizer 16 are then provided over the time division multiplex (TDM) bus 17 to the plurality of digital demodulators 18. The demodulators 18 are typically embodied as digital signal processors (DSPs) which are each programmed to remove the modulation on the channel signals, as specified by the air interface standard being implemented. There may or may not be a one-to-one correspondence between the number, m, of demodulator DSPs 14, and the number, n, of channel signals. For example, the demodulators 18 may each be a programmed to process a number, such as 24, of the channel signals at the same time.

The basestation controller 30, using the TDM bus 17 and conventional bus read and bus write access control signals (not shown), manages access by the n individual digital channel outputs to the m demodulators, such as by assigning a time slot to each channel.

The outputs of the demodulators 18 representing the n audio and/or data signals originated by the mobiles 40 are then forwarded to the transport encoder 19. The encoder 19 reformats the demodulated signals as telephone signals suitable for transmission to a local Mobile Telephone Switching Office (MTSO). The demodulated signals may be reformatted according to any one of a number of well-known time multiplex telephone signal transport protocols, such as the so-called T1 or E1 span. The encoded signals are then processed by the MTSO in a known fashion, to ultimately complete a connection from the mobile units 40 to a desired destination, such as another telephone subscriber who is connected to the Public Switched Telephone Network (PSTN).

In order to set up each connection, the basestation controller 40 must exchange certain control information with the MTSO. For example, a mobile unit 40 wishing to place a call indicates this by signaling the basestation on one or more control signal channels. The basestation controller 30 then forwards this request for access to the MTSO. Upon receiving an indication from the MTSO that the connection can be made, the basestation controller 30 then performs a number of steps, to insure that the appropriate data path through the TDM buses 17 and 23 are enabled to support communication with between the newly enabled mobile 40 and the MTSO.

C. The Wideband Transmitter 20

As mentioned above, the present invention is in the manner in which the transmitter 20 uses the digital phase shifters 23 and digital phase offset generator 26 to minimize variations in the envelope of a composite signal generated by the digital combiner 25. Turning attention now to the transmitter 20 in more detail, digitized voice and/or data signals received from a signal source, such as the MTSO, are provided to the transport decoder 21. The decoder 21 removes the transport signal formatting to provide a plurality of digital baseband channel signals, $x_1(t), x_2(t), \ldots x_n(t)$, representing n voice and/or data signals to be transmitted to the mobiles 41.

The channel signals x(t) are then coupled to a number of digital modulators 22-1, 22-2, ..., 22-m (collectively, digital modulators 22) that modulate the channel signals x(t) according to the desired interface standard, to produce a number, n, of digital baseband modulated signals $y_1(t)$, $y_2(t), \ldots y_n(t)$. As in the case of the demodulators 18, there may or may not be a one to one correspondence between m, the number of digital modulator DSPs, and the number of signals, n, which they process. The digital modulators 22 are programmed to perform the appropriate modulation algorithm, depending upon the air interface standard used to communicate with the mobiles 40. The digital baseband modulated signals typically consist of a series of complex-valued digital data words; that is, the m digital modulators provide the n modulated signals y(t) in so-called in-phase (I) and quadrature (Q) form.

Ultimately, each of the n modulated signals y(t) are then coupled to one of the n inputs of the combiner 24. Analogous to the reverse of the operation in the receiver 10, the TDM bus 24 permits any one of the n modulator outputs $y_i(t)$ to be directed to any one of the n signal inputs of the combiner 25. In other words, each active outgoing channel is typically assigned a unique time slot on the TDM bus 24.

However, before passing the n digital modulated signals $y_i(t)$ to the combiner 25, the digital phase shifters 23 first impart a predetermined complex-valued phase shift $\phi_1$, bx;1$\phi_2$, ... $\phi_n$ to each of the baseband modulated signals $y_i(t)$, to produce a set of m phase-shifted baseband signals $z_1(t), z_2(t), \ldots, z_n(t)$. The n phase shift values $\phi_i$ are determined by the digital phase offset generator 26, in a manner that will be described shortly. It will suffice here to say that these phase shift values depend upon various parameters of the combiner 25, including a bandwidth, $\omega$, of the composite signal c(t), and a channel spacing 1/T.

The digital combiner 25 combines the n phase-shifted channel signals using digital filter bank techniques to synthesize the composite digital signal, c(t). The synthesized composite signal c(t) consists of the n channel signals combined, by frequency-multiplexing (i.e., "RF modulating") them onto n equally-spaced-apart-in-frequency digital carrier signals. In a sense, the function of the combiner 25 is the inverse of the channelizer 16. That is, the combiner 25 generates a composite synthesized signal c(t) consisting of the n channel signals modulated onto n evenly spaced digital carriers, $s_i(t)$.

In a preferred embodiment, the digital combiner 25 consists of an inverse FFT 252 and deconvolutional digital filter 251. The deconvolutional digital filter 251 may use polyphase or overlap and add techniques. Further details of the operation of the inverse FFT 252 and deconvolutional filter 251 are not necessary here, as they are discussed in detail in the co-pending patent application.

The composite signal c(t) is forwarded to the D/A converter 27 and then to frequency upconverter 28. The upconverter 28 translates the intermediate frequency composite signal to the desired radio frequency bandwidth. For example, in an IS-54 implementation, this frequency band is in the range of 800 to 900 MHz.

At this point the signal is fed to the power amplifier 29, which provides a power amplified signal to the transmit antenna 32. As a result, the desired channel signals are passed through the power amplifier with the desired minimum peak-to-average signal power characteristic.

D. The Phase Offset Generator and Phase Shifters

As mentioned above, the phase offset generator 26 and phase shifters 23 optimally control the phases of the carrier signals generated by the digital inverse-FFT combiner 25, to produce a minimum-envelope composite signal c(t), despite the fact that the baseband modulated channel signals $z_i(t)$ all have different modulations, and despite the fact that the phases of the n carrier signals output by the combiner 25 are dictated by the inverse FFT algorithm, and thus cannot be controlled directly.

In accomplishing this, I have first observed that in many applications of wireless systems, a subset of the n channels is typically not in use at any given point in time. Thus the situation is such that no carrier signal at all is being generated for many of the channels.

In other instances, when the channel traffic is relatively heavy, a typical channel is idle much of the time, such as during periods of silence in a voice signal, or during periods when no data is available for transmission.

A given modulated channel signal y(t) thus remains at or near baseband with zero amplitude, frequency or phase deviation much of the time, and the corresponding digital carriers in the composite signal c(t) are also unmodulated. Thus, even the active digital carriers statistically spend most of their time "near" the unmodulated carrier in frequency, phase, and amplitude. In other words, the phase, frequency or amplitude deviation is not that great most of the time, so the situation is such that one can assume that no modulation exists on the carriers, or at least, only very slight modulation.

The invention effects a phase adjustment of the digital carrier signals, in accordance with the so-called Newman phase relationship, to result in a minimized peak-to-average output power most of the time.

The Newman carrier phase shift relationship specifies a constant shift for each carrier signal, which changes only if the channel spacing or total bandwidth changes.

Another observation is that a constant phase shift of a particular digital carrier can be considered to be equivalent to a corresponding constant phase shift of the baseband signal used to modulate the carrier.

To understand how these phase shifts are calculated, consider that a Newman-type phase offset generator 26 determines the set of n complex-valued phase shift values, $\phi_1, \phi_2, \ldots \phi_n$, by the relationship:

$$\phi_i = e^{-j\frac{\omega^2}{4\alpha}} \quad (1)$$

where e is the complex exponential, $\omega$ is the total bandwidth in radians per second of the wideband composite signal c(t) {e.g., the number of input channels, n, times the bandwidth of each channel (in this example, the bandwidth is 30 kHz)}, and a is given by the relationship:

$$\alpha = \frac{i\pi}{T} \quad (2)$$

where 1/T is the spacing between channels, also in radians per second.

Knowing $\omega$ and T, then, the complex-valued phase shifts $\phi_1, \phi_2, \ldots \phi_n$, can be determined from the complex exponential relationship $$e^{j\phi} = \cos\phi + j\sin\phi. \quad (3)$$

That is, the in-phase (I) part of a complex-valued phase shift $\phi_i$ is determined by the offset generator determining the cosine, and the quadrature (Q) part by determining the sine.

Since the phase offset values $\phi_i$ remain constant for a given basestation configuration, the offset generator 26 need only calculate them when the basestation channel bandwidths or number of channels changes. Thus, the offset generator functions may be performed by suitable programming of any available processor, such as the basestation controller 30, and simply retained in a memory that is accessed as needed by the phase shifters 23.

If the basestation will always have the same configuration, then the offset generator 26 may be implemented as a read only memory (ROM) having the pre-calculated values stored therein.

Knowing that the phase shift $\phi_i$ remains constant, it can now be understood how the imparting of a phase shift at the input to the combiner 25 effects the phase of the carriers at the outputs of the combiner in the desired way. Consider that desired operation of the combiner in transmitting a given carrier signal $s_i(t)$ is represented mathematically by:

$$s_i(t) = y(t) \cdot e^{j(\omega_{ci} t + \phi_i)} \tag{4}$$

where $\omega_{ci}$ is the i'th carrier frequency (in radians per second) and $\phi_i$ the desired constant carrier phase shift, as described above. Making use of a mathematical identity, this is equivalent to:

$$s_i(t) = y(t) \cdot e^{j\omega_{ci} t} \cdot e^{j\phi_i}, \tag{5}$$

Since the order of the multiplications does not matter, the phase shift operation denoted by the term $e^{j\phi_i}$ in equation (5) can be thus performed before the zero-shift channelizer operation denoted by $e^{j\omega_{ci} t}$.

The digital phase shifters 23 themselves might be implemented as discrete electronic digital integrated circuits, but are preferably implemented as additional software steps in the same digital signal processor which implements the modulators 22.

Figure 2:
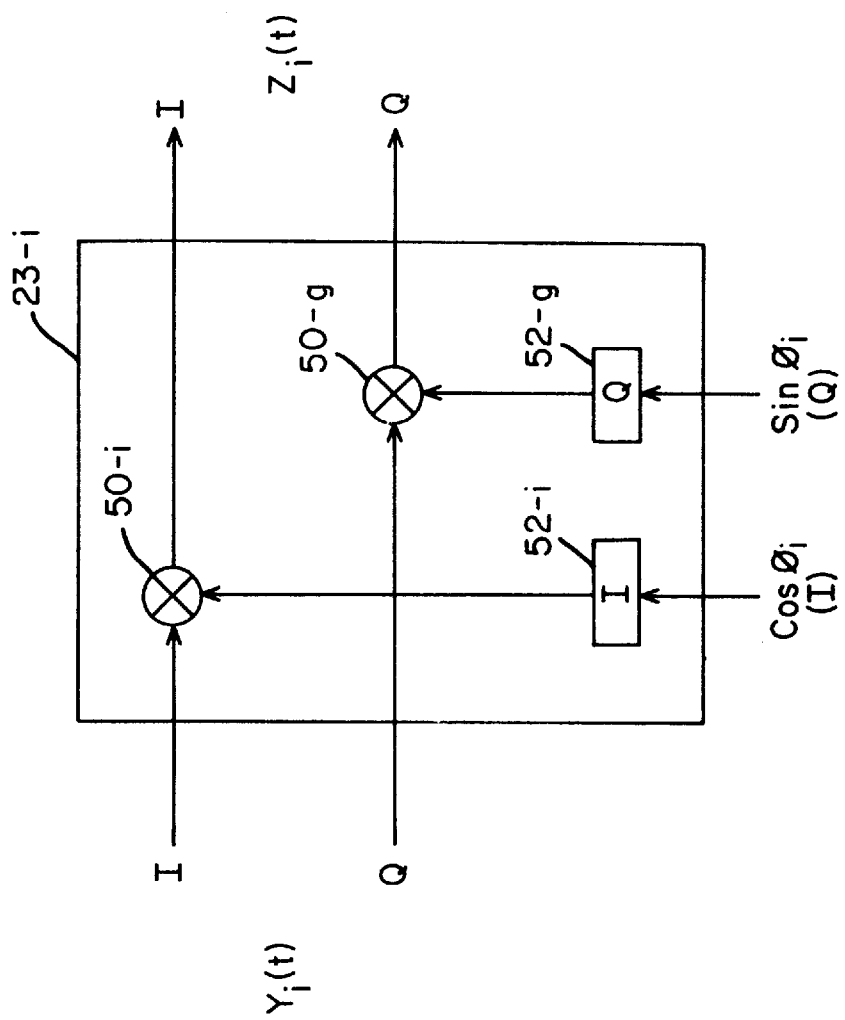
FIG. 2 is a detailed block diagram of an exemplary one of the phase modulators of FIG. 1.

FIG. 2 shows a signal flow graph which describes either a hardware or software implementation of an exemplary complex-valued digital phase shifter 23-i. The I and Q portions of the corresponding baseband modulated signal $y_i(t)$ are fed to one input of a respective pair of multipliers 50-i, 50-q. The I and Q portions of the complex phase shift, $\phi_i$, since they are constant, may be stored in corresponding local memory location or registers 52-i, 52-q. The outputs of the I and Q registers 52-i, 52-q, are provided to the other inputs of the respective ones of the multipliers 50-i, 50-q. The phase-shifted digital modulated signal $z_i(t)$ thus appears as a complex valued I and Q outputs.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A transmitter for processing signals in a wireless communication system which includes multiple mobile subscriber units, the transmitter comprising:

channel signal means, for providing a plurality, n, or baseband channel signals, $x_1(t), x_2(t), \ldots, x_n(t)$, the baseband channel signals representing signals to be transmitted to a plurality of the mobile subscriber units;

phase adjusting means, connected to receive at least a subset of the n baseband channel signals from the channel signal means, for adjusting the phases of the received subset of the n baseband channel signals, and for providing a plurality of phase adjusted baseband signals $x_1(t), z_2(t), \ldots, z_m(t)$ in response thereto, the phase adjustment of each phase adjusted baseband signal being in accordance with a prescribed phase shift relationship, and the prescribed phase relationship being selected so as to reduce a peak-to-average power in a power amplified radio frequency, RF, signal;

wideband digital combiner means, connected to the output of the phase adjusting means, for receiving the plurality of phase adjusted baseband signals $z_1(t), z_2(t), \ldots, z_m(t)$, and for combining a plurality, m, of the phase adjusted baseband signals $z_1(t), z_2(t), \ldots, z_m(t)$ onto a like plurality of carrier signals, to produce a composite digital signal, c(t), the composite signal c(t) consisting of the n phase adjusted baseband signals modulated onto a like number, n, of digital carrier signals spaced apart in frequency, the wideband composite digital signal c(t) having a predetermined bandwidth;

digital-to-analog (D/A) conversion means, connected to receive the composite digital signal, c(t), and to provide an analog signal;

up-converter means, connected to the D/A converter, for up-converting the analog signal to produce a radio frequency, RF, signal;

a power amplifier, connected to receive the RF signal, and to provide the power amplified RF signal; and an antenna, for receiving the power amplified RF signal, and for providing the signal to the plurality of mobile subscriber units.

2. A transmitter as in claim 1 additionally comprising:

a plurality of modulation means, connected to the channel signal means to receive a plurality of the baseband channel signals which are to be transmitted to the mobile subscriber units, for providing a plurality, m, of digitally modulated baseband signals, $y_1(t), y_2(t), \ldots, y_m(t)$, each digitally modulated baseband signal being a baseband signal modulated in accordance with the signals to be provided to the plurality of the mobile subscriber units, and each of the n digitally modulated baseband signals thus being forwarded to the phase adjusting means as the subset of baseband channel signals.

3. A transmitter as in claim 2 wherein the phase adjustment means comprises:

a plurality of digital phase shifter means disposed between the output of the plurality of modulation means and the inputs to the digital combiner means, each such phase shifter means being arranged to impart a different phase shift to a respective one of the n digitally modulated baseband signals.

4. A transmitter as in claim 3 wherein the phase adjustment means additionally comprises:

offset generator means, for determining a plurality of phase offsets to be fed to the digital phase shifters.

5. A transmitter as in claim 4 wherein the offset generator means additionally comprises:

means for determining the plurality, n, of phase offsets, $\phi_1, \phi_2, \ldots, \phi_n$, by the relationship:

$$\phi_i = e^{-j\frac{\omega^2}{4\alpha}}$$

where e is a complex exponential, $\omega$ is a total bandwidth in radians per second of the wideband composite signal c(t) and $\alpha$ is given by the relationship:

$$\alpha = \frac{i\pi}{T}$$

where i is a channel index number ranging from 1 to n, and 1/T is the channel spacing, in radians per second.

6. A transmitter as in claim 5 wherein the digital phase shifter means are complex-valued phase shifters.

7. A transmitter as in claim 6 wherein the complex-valued phase shifters comprise:

a pair of digital multipliers, with an in-phase multiplier connected to multiply an in-phase (I) component of the corresponding phase offset and an in-phase (I) component of the digitally modulated baseband signal, and a quadrature multiplier connected to multiply a quadrature (Q) component of the corresponding phase offset and a quadrature (Q) component of the digitally modulated baseband signal.

8. A transmitter as in claim 3 wherein the complex-valued phase shifters are implemented in a programmable processor.

9. A transmitter as in claim 6 wherein the complex-valued phase shifters and modulator means are each implemented in the same programmable processor.

10. A method for processing signals in a multiple mobile subscriber unit wireless communication system comprising:

providing a plurality, n, of baseband channel signals, $x_1(t), x_2(t), \ldots, x_n(t)$, the baseband channel signals representing signals to be transmitted to a plurality of the mobile subscriber units;

adjusting the phases of at least a subset of the n baseband channel signals, and providing a plurality of phase adjusted baseband signals $z_1(t), z_2(t), \ldots, z_m(t)$ in response thereto, the phases being adjusted according to a prescribed phase shift relationship, the prescribed phase relationship being selected to reduce the peak to average power in a power amplified radio frequency, RF, signal;

digitally combining a plurality of the phase adjusted baseband signals $z_1(t), z_2(t), \ldots, z_m(t)$ onto a like plurality of carrier signals, to produce a composite digital signal, c(t), consisting of the n phase adjusted baseband signals modulated onto a like number, n, of digital carrier signals spaced apart in frequency, the wideband composite digital signal c(t) having an envelope that varies over time and a predetermined bandwidth;

digital-to-analog (D/A) converting the composite digital signal, c(t), to provide an analog signal;

up-converting the analog signal to produce a radio frequency, RF, signal;

power amplifying the RF signal, to provide the power amplified RF signal; and transmitting, via an antenna, the power amplified RF signal to the plurality of mobile subscriber units.

11. A method as in claim 10 additionally comprising:

modulating a plurality of the baseband channel signals which are to be transmitted to the plurality of mobile subscriber units, to provide a plurality, m, of digitally modulated baseband signals, $y_1(t), y_2(t), \ldots, y_m(t)$, each digitally modulated baseband signal having a predetermined channel bandwidth, and each digitally modulated baseband signal being forwarded to the phase adjusting step as the subset of baseband channel signals processed by the phase adjusting step prior to being processed by the digital combining step.

12. A method as in claim 11 wherein the step of adjusting the phases comprises the step of:

shifting the phases of a plurality of the digitally modulated baseband signals, each such phase shift being such that it imparts a different phase shift to a respective one of the digitally modulated baseband signals.

13. A method as in claim 10 wherein the step of adjusting the phases additionally comprises the steps of:

generating a plurality of phase offsets to be used by the phase shifting step.

14. A method as in claim 13 wherein the step of generating a plurality of phase offsets additionally comprises:

determining a plurality, n, of phase offsets, $\phi_1, \phi_2, \ldots \phi_n$, using the relationship:

$$\phi_i = e^{-j\frac{\omega^2}{4\alpha}}$$

where e is a complex exponential, $\omega$ is a total bandwidth in radians per second of the wideband composite signal c(t) and $\alpha$ is given by the relationship:

$$\alpha = \frac{i\pi}{T}$$

where i is a channel index number ranging from 1 to m, and 1/T is the channel spacing, in radians per second.

15. A method as in claim 14 wherein the step of adjusting the phases includes the step of complex-valued phase shifting.

16. A method as in claim 15 wherein the step of complex-valued phase shifting comprises:

multiplying, with a pair of digital multipliers, an inphase component of the corresponding phase offset with an in-phase component of the digitally modulated baseband signal, and a quadrature component of the corresponding phase offset with a quadrature component of the digitally modulated baseband signal.

17. A method as in claim 16 wherein the step of complex-valued phase shifting is implemented in a programmable processor.

18. A method as in claim 17 wherein the steps of complex-valued phase shifting and digitally modulating are implemented in the same programmable processor.

* * * * *